(12) United States Patent
Sun et al.

(10) Patent No.: US 10,180,710 B2
(45) Date of Patent: Jan. 15, 2019

(54) ADJUSTABLE COOLING FOR ELECTRONIC DEVICES

(71) Applicant: Intel Corporation, Santa Clara, CA (US)

(72) Inventors: Yanbing Sun, Shanghai (CN); Yongkang Wu, Shanghai (CN); Jeff King, Portland, OR (US); Peifeng Si, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 15/325,609

(22) PCT Filed: Aug. 11, 2014

(86) PCT No.: PCT/CN2014/084066
§ 371 (c)(1),
(2) Date: Jan. 11, 2017

(87) PCT Pub. No.: WO2016/023143
PCT Pub. Date: Feb. 18, 2016

(65) Prior Publication Data
US 2017/0160775 A1    Jun. 8, 2017

(51) Int. Cl.
G06F 1/20        (2006.01)
F24F 11/79      (2018.01)
(Continued)

(52) U.S. Cl.
CPC ......... *G06F 1/206* (2013.01); *B60H 1/00021* (2013.01); *B60H 1/00642* (2013.01);
(Continued)

(58) Field of Classification Search
CPC ....................................................... G06F 1/206
See application file for complete search history.

(56) References Cited

U.S. PATENT DOCUMENTS 5,414,591 A * 5/1995 Kimura ..................... G06F 1/20
                                                       361/679.33
5,447,286 A * 9/1995 Kamen ................ B60N 2/4415
                                                       251/30.02
(Continued)

FOREIGN PATENT DOCUMENTS

CN        2757218 Y        2/2006
CN      201047361 Y        4/2008
(Continued)

OTHER PUBLICATIONS

International Search Report and Written Opinion dated May 20, 2015 from International Application No. PCT/CN2014/084066, 16 pages.

*Primary Examiner* — David M Sinclair
*Assistant Examiner* — Robert Brown
(74) *Attorney, Agent, or Firm* — Schwabe, Williamson & Wyatt, P.C.

(57) ABSTRACT

Apparatuses, methods and storage media associated with a plurality of cooling devices thermally coupled to a plurality of heat-generating components of an electronic device, such as a server, a configured rack of servers, or a configured rack of server elements, are disclosed herein. Each cooling device may be associated with a unique cooling zone for the components. Logic may be coupled with the plurality of cooling devices, and the logic may be configured to cause a first cooling zone of a first cooling device to overlap a second cooling zone of a second cooling device. Other embodiments may be described and/or claimed.

18 Claims, 9 Drawing Sheets

(51) Int. Cl.
  *B60H 1/00* (2006.01)
  *B60H 1/22* (2006.01)
(52) U.S. Cl.
  CPC ........... *B60H 1/00664* (2013.01); *B60H 1/22* (2013.01); *F24F 11/79* (2018.01); *G06F 1/20* (2013.01)

(56) References Cited

U.S. PATENT DOCUMENTS

| | | | | |
|---|---|---|---|---|
| 8,248,794 | B2* | 8/2012 | Li | H01L 23/4006 |
| | | | | 361/691 |
| 2006/0218428 | A1* | 9/2006 | Hurd | G06F 1/10 |
| | | | | 713/500 |
| 2011/0184568 | A1* | 7/2011 | Tai | G05D 23/1934 |
| | | | | 700/282 |
| 2011/0228471 | A1* | 9/2011 | Humphrey | F04D 27/004 |
| | | | | 361/679.48 |
| 2011/0235272 | A1* | 9/2011 | Bash | H05K 7/20609 |
| | | | | 361/692 |
| 2013/0242504 | A1* | 9/2013 | Cartes | G05D 23/1931 |
| | | | | 361/679.49 |
| 2016/0174413 | A1* | 6/2016 | Steinbrecher | H05K 7/20727 |
| | | | | 361/679.51 |

FOREIGN PATENT DOCUMENTS

| | | |
|---|---|---|
| CN | 102262426 A | 11/2011 |
| WO | 2004103745 A1 | 12/2004 |

* cited by examiner

ADJUSTABLE COOLING FOR ELECTRONIC DEVICES

CROSS REFERENCE TO RELATED APPLICATIONS

The present application is a national phase entry under 35 U.S.C. § 371 of International Application No. PCT/CN2014/084066, filed Aug. 11, 2014, entitled "ADJUSTABLE COOLING FOR ELECTRONIC DEVICES", which designated, among the various States, the United States of America and is hereby incorporated by reference.

TECHNICAL FIELD

The present disclosure relates to the field of thermal cooling for electronic devices, and specifically to adaptively adjustable cooling devices in computer server environments.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In electronic devices, e.g., legacy servers, the configuration of thermal cooling devices such as cooling fans may be fixed and designed for a configuration running with a heavy system load using the maximum number of electrical and/or optical components. This configuration may be a "worst case" type scenario and result in the device generating the maximum possible thermal heat. However, in some cases such a worst case scenario may not be occurring, for example if the device does not include the maximum number of optical and/or electrical components possible, or if the device is not running at a maximum system load. In these situations, a cooling system designed for a worst case scenario may not be necessary. In other cases a specific component may run with a significantly heavier system load than other components, which may generate a localized "hot spot" in the device. In other situations, a single cooling device such as a fan may fail, and therefore the cooling capacity of the device may be impacted.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
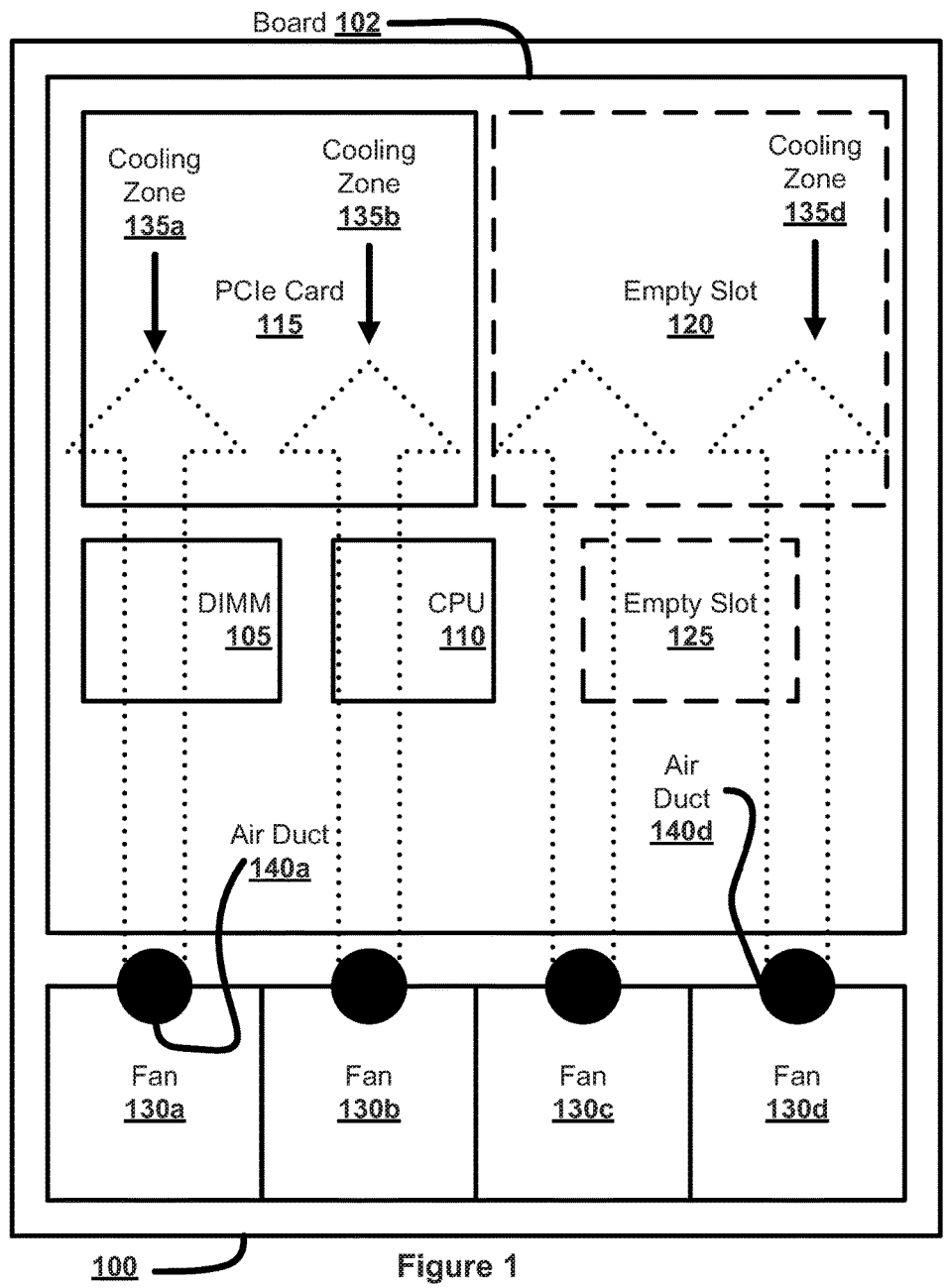
FIG. 1 illustrates a high level schematic view of an electronic system with adjustable air ducts, in accordance with various embodiments.

Disclosed embodiments include apparatuses, methods and storage media associated with a plurality of cooling devices thermally coupled to a plurality of electrical and/or optical components of an electronic device, such as a electronic device, in particular, a computer server. Each cooling device may be associated with a unique cooling zone for the components. Logic may be coupled with the plurality of cooling devices, and the logic may be configured to cause a first cooling zone of a first cooling device to overlap a second cooling zone of a second cooling device.

In some embodiments, the cooling devices may be cooling fans. In some embodiments, the cooling zones may be configured to overlap based on rotation or adjustment of air ducts generally positioned between each cooling device and the cooling zones associated with the cooling devices. In other embodiments, the cooling zones may be configured to overlap based on rotation or lateral movement of thermal partitions separating the cooling zones.

As discussed herein, electrical and/or optical components may include components such as processors, central processing units (CPUs), memory such as dynamic random access memory(DRAM), flash memory, dual inline memory modules (DIMMs), logic, a peripheral component interconnect express (PCIe) card, an audio chip, a graphics chip, read only memory (ROM), a wired or wireless communication chipset, a hard disk drive (HDD), or other components. It will be understood that the above description of electrical and/or optical components is intended as a non-exhaustive list of descriptive examples, and additional or alternative components to those listed above may be used in other embodiments. The electrical and/or optical components may be generically referred to herein as heat-generating components.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 schematically illustrates an electronic device 100. In some embodiments, the electronic device 100 may be a server or a server blade in a rack server, while in other embodiments the electronic device 100 may be a smart phone, a tablet computer, an Ultrabook™, an e-reader, a laptop computer, a desktop computer, set top box, a digital video recorder, an audio amplifier, and/or a game console. The electronic device 100 may include a circuit board 102. In some embodiments, the circuit board 102 may have one or more heat-generating components coupled with the circuit board 102. For example, in the embodiments depicted in FIG. 1, the circuit board 102 may include a peripheral component interconnect express (PCIe) card 115, a DIMM 105, and a CPU 110. In other embodiments, the heat-generating components may include components such as an audio chip, a graphics chip, DRAM, read only memory (ROM), a wired or wireless communication chipset, or some other heat-generating component may be coupled with the circuit board 102 either in addition to, or as an alternative to, the components depicted in FIG. 1.

In some embodiments, the circuit board 102 may also include an empty slot such as empty slots 120 and 125. The empty slots 120 and 125 may be slots to which additional heat-generating components may be coupled.

In embodiments, the electronic device 100 may include a plurality of cooling devices such as fans 130a-130d. For the sake of clarity, the cooling devices may generally be referred to as fans or cooling fans in the discussion below, however in other embodiments the cooling device may be a heatsink or some other type of active or passive cooling device. In some embodiments, the fans 130a-130d may be physically coupled to the board 102, while in other embodiments, the fans 130a-130d may not be physically coupled to the board 102, but may still be thermally coupled to the board 102 and one or more heat-generating components of the board. Specifically, the fans 130a-130d may be thermally coupled with the heat-generating components of the board 102 via one or more air ducts such as air ducts 140a and 140d. As used herein, "thermally coupled" may refer to the configuration where one device is able to add or remove heat from another device. For example, the fans 130a-130d may be thermally coupled with the board 102 or one or more heat-generating components of the board 102 because the fans 130a-130d may remove heat from the board 102 or the one or more heat-generating components of the board 102 by causing air to be blown on, or otherwise drawn over, the board 102 or the one or more heat-generating components of the board 102. It will be understood that the electronic device 100 may include additional air ducts as shown in FIG. 1, but only air ducts 140a and 140d are labeled for the sake of clarity. A cooling device such as fan 130a may be able to blow air through air duct 140a to generate cooling zone 135a. Alternatively, the fan 130a may be configured to draw air from the vicinity of the board 102 through the air duct 140a, and thereby expel heat generated by one or more heat-generating components of the board 102. As used herein, the term "cooling zone" may refer to the region of a device that is cooled due to a specific cooling device. Therefore, cooling zone 135a may designate the region of board 102 that is cooled due to fan 130a. It will be understood that although cooling zone 135a is depicted in FIG. 1 as an arrow with defined borders, the depiction is intended to illustrate the general direction of cooling zone 135a rather than any specific borders that may be inferred from the specific dimensions of the arrow. Additionally, as used herein, the term "overlap" as used to refer to different cooling zones may not refer to the situation where the cooling zones are generally parallel to one another, for example as shown in FIG. 1.

In some cases, the configuration of the air ducts and the cooling devices may be based around a worst-case scenario in which the board 102 is coupled with the maximum number of available components, and that components are experiencing a heavy system load. In this worst case scenario, an even distribution of cooling zones such as cooling zones 135a, 135b, and 135d may be desirable. However, in some embodiments such as the embodiment depicted in FIG. 1, the board 102 may not be coupled with the maximum number of available heat-generating components. In some embodiments, a board 102 with heat-generating components may be referred to as a "populated" board 102. In other embodiments, the portion of the board 102 that is coupled with components may be referred to as "populated" while portions of the board 102 that are not coupled with the components may be referred to as "unpopulated."

In these embodiments, a cooling zone such as cooling zone 135d that is primarily directed towards empty slots 120 and 125 may not provide the most efficient cooling for the electronic device 100. In some embodiments, one or more of the cooling devices, for example fan 130b, may experience a mechanical fault and operate at less than its full possible capacity, which may mean that components in cooling zone 135b may not be efficiently cooled. In some embodiments, one of the components, for example the CPU 110, may operate at a significantly increased capacity and the cooling provided by fan 130b may not be sufficient to cool the CPU 110. As discussed herein, the mechanical failure of the cooling device, generation of a hotspot, or alternative arrangement of components on a board 102 may be described as a "heat condition." In other embodiments, one or more other heat conditions may exist.

In some embodiments, therefore, it may be desirable to configure the air ducts such as air ducts 140a or 140d such that they are movable and the direction or size of the cooling zones may be changeable. For example, in some embodiments one or more air ducts may be coupled with a micro electric motor (not shown for ease of understanding FIG. 1) which is able to adaptively adjust the size of the air duct or the direction that the air duct is pointing according to current system needs. The adjustable air duct may be used to dynamically adjust airflow direction or volume between the board 102 and one or more of the fans 130a-130d to meet the cooling requirements of the electronic device 100 in real-time.

Figure 2:
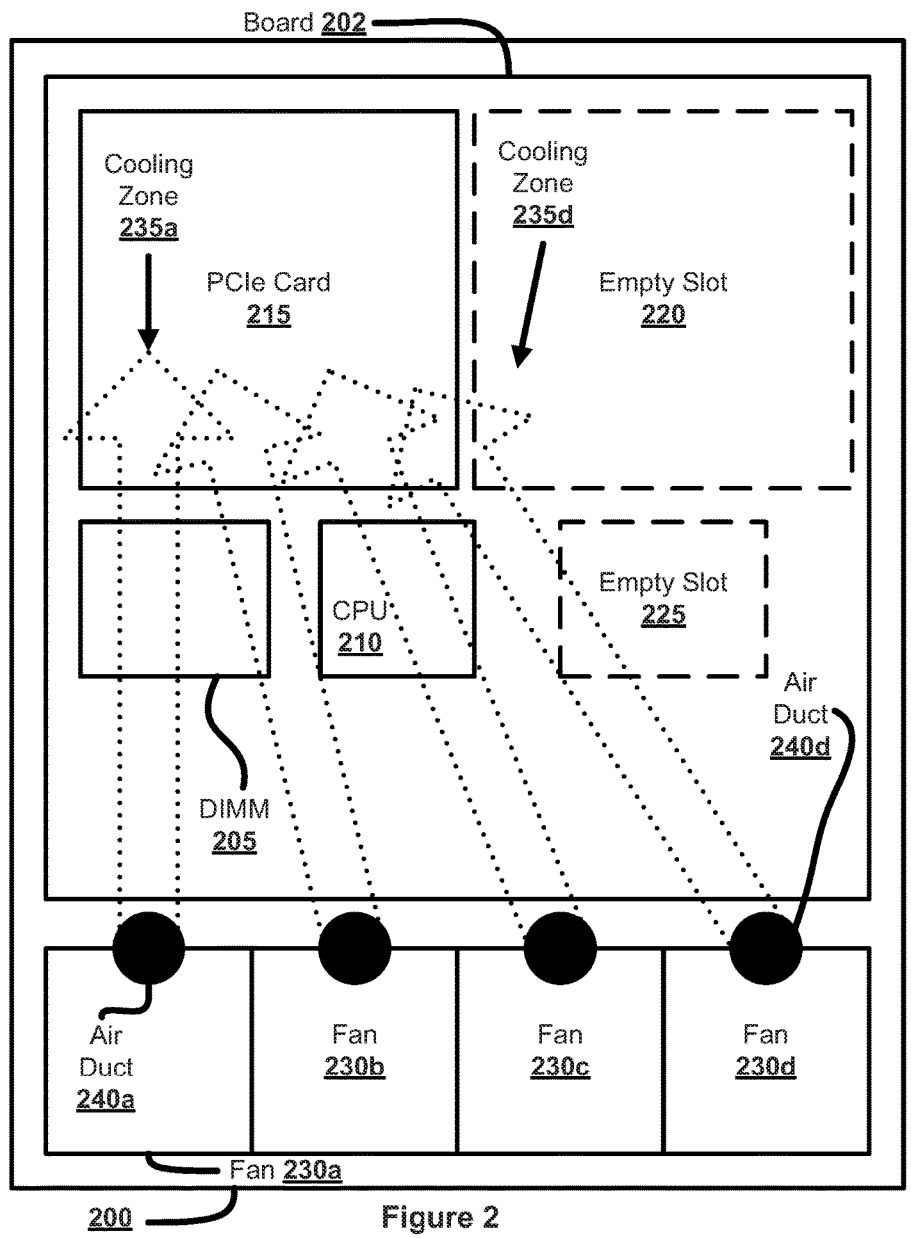
FIG. 2 illustrates an alternative high level schematic view of an electronic system with adjustable air ducts, in accordance with various embodiments.

FIG. 2 depicts an embodiment of the electronic device 200 where the air ducts have been physically rotated or otherwise adjusted to meet system needs. The electronic device 200 may include a board 202, DIMM 205, CPU 210, PCIe card 215, empty slots 220 and 225, fans 230a-230d, and air ducts 240a and 240d which may be respectively similar to electronic device 100, board 120, DIMM 105, CPU 110, PCIe card 115, empty slots 120 and 125, fans 130a-130d, and air ducts 140a and 140d.

In the embodiment shown in FIG. 2, air ducts such as air duct 240d may have been physically rotated such that the cooling zone 235d generated by fan 230d is directed towards PCIe card 215 instead of empty slots 220 and 225. The cooling zones (unlabeled for use of understanding in FIG. 2) associated with fans 230b and 230c may be similarly rotated. The rotation of the air ducts, and therefore the cooling zones, may allow the fans 230a-230d to more efficiently and quickly cool the components of electronic device 200.

In other embodiments, the air ducts may be rotated to direct the cooling zones to remedy one or more of the other heat conditions discussed above. For example, even if the board 202 has components in empty slots 220 and/or 225, in some embodiments the PCIe card 215 may be operating in a significantly increased capacity, and therefore generating increased heat. In these embodiments, it may be desirable for the air ducts to rotate such that the cooling zones associated with each of the fans are generally directed towards the PCIe card 215. In other embodiments, if, for example, fan 230a experienced mechanical failure, it may be desirable for the air ducts to rotate as shown in FIG. 2 to more evenly distribute the cooling zones associated with each fan 230b, 230c, and 230d, to compensate for the cooling zone 235a being reduced or not present.

In some embodiments, the presence of a heat condition may be identified based on a system check for the presence of empty slots such as empty slots 220 or 225. In some embodiments, the presence of a heat condition may be identified based on one or more thermal sensors (not shown for the sake of clarity in FIG. 2) coupled with board 202. In some embodiments, both the air ducts and the thermal sensors may be coupled with the logic (similarly not shown for the sake of clarity in FIG. 2). The logic may be configured to identify the presence of a heat condition and facilitate rotation of the air ducts to attempt to remedy the heat condition.

Figure 3:
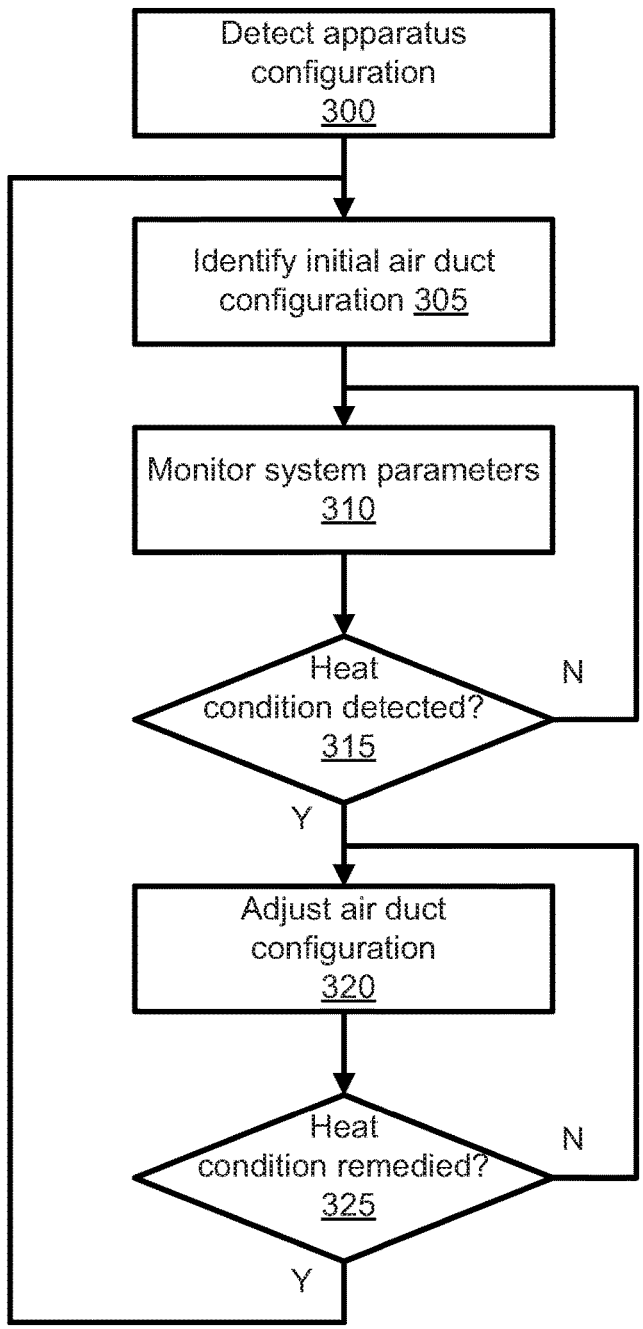
FIG. 3 illustrates an example method of cooling an electronic system with adjustable air ducts, in accordance with various embodiments.

FIG. 3 depicts an example process for remedying the heat condition using the adjustable air ducts shown in FIGS. 1 and 2. Specifically, the process of FIG. 3 may be performed by a logic which, as noted above, may be a process, module, circuitry, chipset, or other component of the electronic device 100 or 200. In embodiments, the logic may be implemented as software, hardware, firmware, or a combination thereof. For example, in some embodiments the CPU 110 may include the logic implemented as firmware, and/or the logic may be implemented as non-transitory computer-executable instructions stored in the DIMM 105.

In some embodiments, the logic may be implemented in or on a baseboard management controller (BMC) or secondary management controller implemented in, or communicatively coupled to, the electronic device 100 or 200. As noted above, in embodiments the logic may be the hardware of the BMC or secondary management controller, or software/firmware associated with the BMC or secondary management controller. In embodiments, the logic such as the BMC and/or secondary management controller, and their associated software and/or firmware modules, may be responsible for dynamically determining the configuration and/or thermal state of components and/or sensors of electronic devices 100 or 200. In embodiments, the logic may respond to changes in system configuration and/or thermal state with changes in configuration of the fans 130a-130d, as described above.

In other embodiments, the process may be performed by a separate logic process, module, circuitry, chipset, or component of the electronic device 100 or 200 such as a read-only memory (ROM). In some embodiments, the process may be performed by a logic process, module, circuitry, chipset, or component that is separate from, but communicatively coupled with, the electronic device 100 or 200, for example over a wired or wireless network. Although the electronic device and/or logic is described as a single entity performing certain monitoring or alteration steps, in some embodiments the monitoring and alteration may be performed by logic associated with different processors or logical modules. For example, there may exist separate monitoring logic and alteration logic.

Initially, an apparatus configuration may be detected at 300 by the logic. For example, the apparatus configuration may be identified by the logic based on a system configuration stored in a basic input/output system (BIOS). In other embodiments, the apparatus configuration may be detected based on the logic, BMC, or secondary management controller as described above. Specifically, the apparatus configuration may identify a worst case or most common configuration of heat-generating components coupled with a circuit board such as boards 102 or 202. An initial air duct configuration may then be identified at 305, e.g. by the logic based on the BIOS or one or more of the other identification options described above. In some embodiments, the initial air duct configuration may be based on the initial apparatus configuration identified at 300. The initial air duct configuration may be, for example, the configuration of air ducts and their associated cooling zones shown in FIG. 1.

During operation of a electronic device such as electronic devices 100 or 200, the parameters of the electronic device may be monitored by the logic at 310. For example, the electronic device, or specifically the logic of the electronic device, may monitor for localized or general thermal increases or decreases, the mechanical status of one or more of the cooling devices of the electronic device, a change in device configuration such as addition or removal of a heat-generating component, or one or more other system parameters. As an initial monitoring check at 310, the electronic device or logic of the electronic device may identify whether empty slots such as empty slots 220 are 225 are present, as described above.

At 315, a determination may be made by the logic on whether a heat condition is detected. If a heat condition is not detected based on the monitoring of system parameters, then the process may continue with the system parameters being monitored by the logic at 310, as earlier described. However, if a heat condition is detected at 315, for example the presence of empty slots, a mechanical failure of a cooling device, a localized hotspot due to a component of the board working at an increased rate, or some other heat condition, then the air duct configuration may be adjusted by the logic at 320. For example, the logic may facilitate the movement or rotation of one or more servos or motors coupled with the air ducts to cause a physical rotation or lateral movement of the air ducts, as described above. Based on this movement of the air ducts, a cooling zone associated with each cooling device may be moved or rotated to a different portion of the electronic device or the board of the electronic device, as described above.

The logic may then check whether the heat condition(s) have been remedied at 325. If the heat condition has been remedied, then the process, and particularly the logic, may return the air duct configuration to the initial air duct configuration at 305, e.g., by facilitation of movement or rotation of the air ducts back to their original configuration. However, in other embodiments, the process may leave the air ducts in their adjusted configuration, or the logic may facilitate movement or rotation of the air ducts to be positioned between the initial air duct configuration and the current air duct configuration at 320 to attempt to prevent the heat condition from returning. If the heat condition has not been remedied at 325, in some embodiments the process or logic may further adjust the air duct configuration at 320, e.g., by facilitating further movement or rotation of the air ducts. However, in other embodiments further adjustment of the air duct configuration may not be possible, and the process and/or logic may take further remedial action such as signaling the heat condition to a user through a message on a display screen or a warning light, initiating shutdown of one or more components of the system, throttling the system, or performing one or more other remedial actions.

Figure 4:
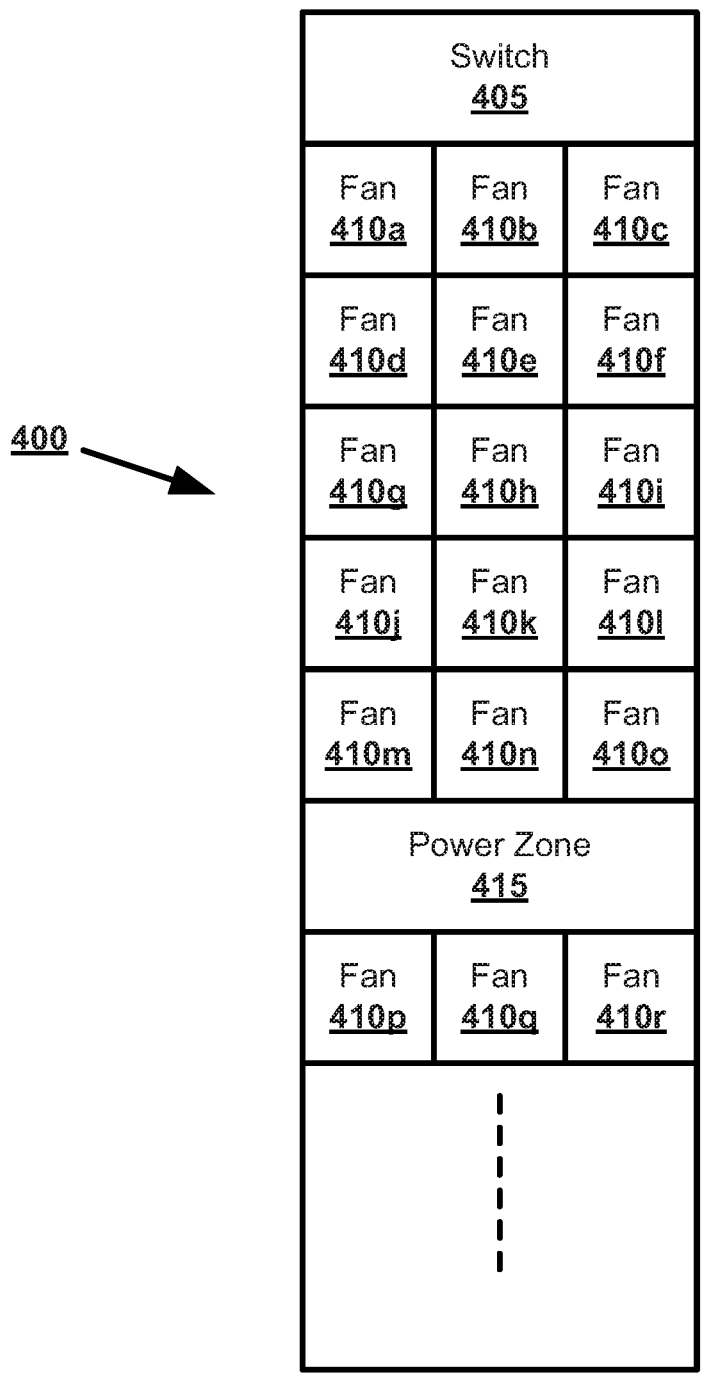
FIG. 4 illustrates a high level rear view of an electronic system with adjustable thermal partitions, in accordance with various embodiments.

In alternative embodiments, a heat condition such as the heat conditions described above may be remedied through the use of thermal partitions. FIG. 4 depicts a rear view of an electronic device 400 such as a configured rack of servers or a configured rack of server elements that may benefit from the use of thermal partitions. In embodiments, the electronic device 400 may include a switch 405 and a power zone 415. In embodiments, the switch 405 may be an Ethernet switch. The electronic device 400 may additionally include a plurality of cooling devices such as cooling fans. Specifically, in the embodiment shown in FIG. 4, the electronic device 400 may include fans 410*a* through 410*r*. In embodiments, a row of fans such as fans 410*a*, 410*b*, and 410*c* may generally correspond to or be associated with a cooling zone as described in further detail below.

Figure 5:
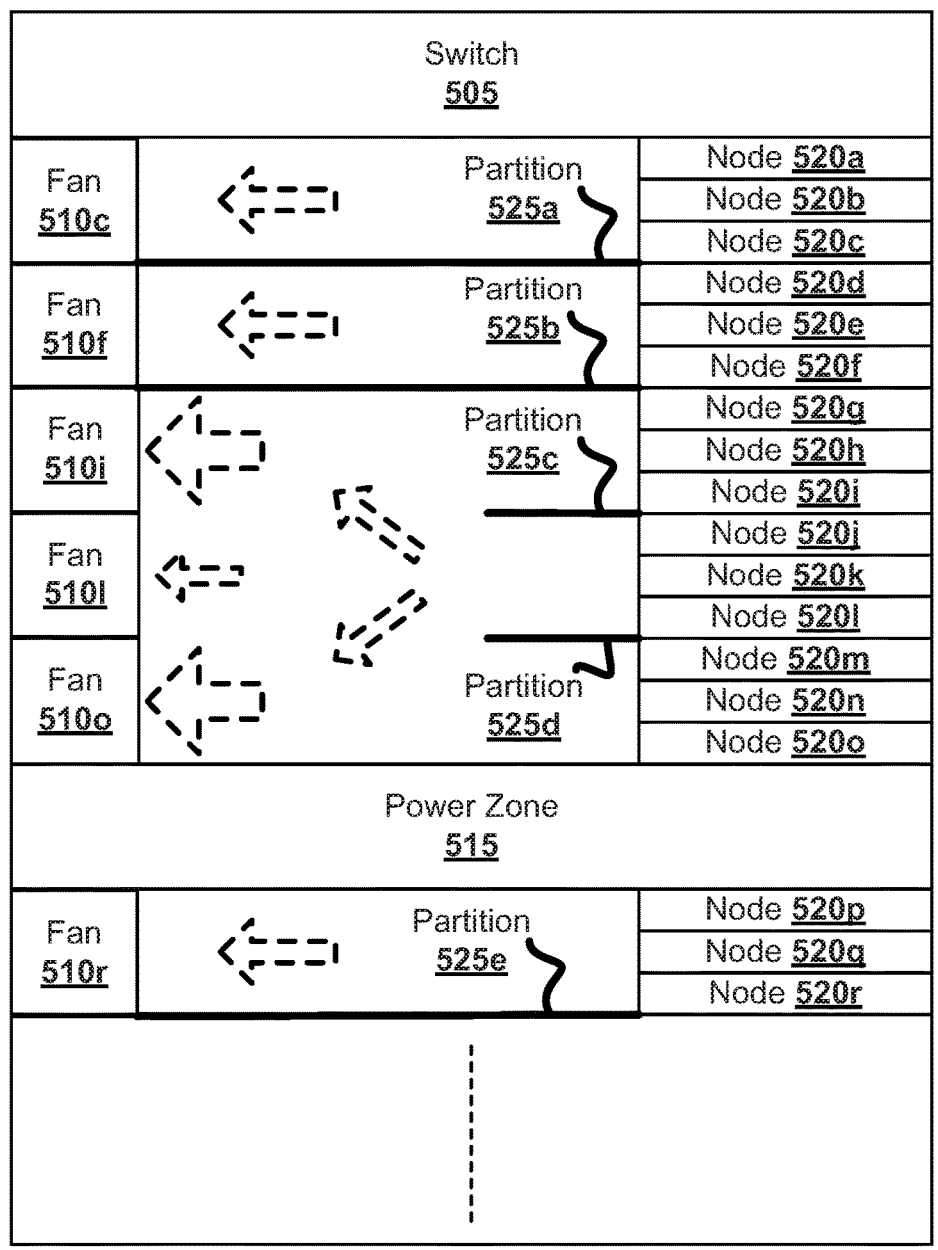
FIG. 5 illustrates a high level side view of an electronic system with adjustable thermal partitions, in accordance with various embodiments.

FIG. 5 depicts a side view of an electronic device 500 that may be similar to the electronic device 400. In embodiments, the electronic device 500 may also be a configured rack of servers or a configured rack of server elements that includes a switch 505, a power zone 515, and fans 510*c*, 510*f*, 510*i*, 510*l*, 510*o*, and 510*r*, respectively similar to switch 405, power zone 415, and fans 410*c*, 410*f*, 410*i*, 410*l*, 410*o*, and 410*r* as described above with respect to FIG. 4. Electronic device 500 may also include a plurality of nodes such as nodes 520*a* through 520*r*. As depicted in FIG. 5, a node such as nodes 520*a*-520*r* may generally correspond to an electronic device such as electronic devices 100 or 200, though in other embodiment a node may refer to subsections of an electronic device such as electronic devices 100 or 200, as described in further detail below.

For the illustrated embodiments, the electronic device 500 may further include a plurality of thermal partitions such as partitions 525*a*-525*e*. Specifically, the thermal partitions may be configured to define a specific cooling zone associated with one or more of the fans of the electronic device 500. As shown in FIG. 5, partitions 525*a* and 525*b* may define a cooling zone associated with fan 510*f* containing nodes 520*d*-520*f*. In embodiments, the cooling zone may be associated with a row of fans as shown in FIG. 4. However, in the discussion below, generally only one fan of a given cooling zone (i.e. fans 510*c*, 510*f*, 510*i*, 510*l*, 510*o*, or 510*r*) are discussed for the sake of conciseness and clarity. For example, it will be understood that a cooling zone associated with fan 510*f* may also be considered to be associated with fans 410*d* or 410*e*.

Specifically, the cooling zone located between partitions 525*a* and 525*b* may be associated with fan 510*f*. Nodes 520*d*-520*f* may be within the cooling zone located between partitions 525*a* and 525*b*.

In some embodiments, the electronic device 500 may experience a heat condition, and it may be desirable for one or more of the thermal partitions to be moved so that a fan associated with a first cooling zone is able to assist with cooling a second cooling zone. In specific, if one or more of the nodes in a given cooling zone is generating an excess amount of thermal heat, then the one or more fans associated with that cooling zone may not be able to sufficiently cool the node. Alternatively, in some embodiments, one or more fans of a given cooling zone may suffer from a mechanical failure and not be able to efficiently cool the nodes in that cooling zone.

In some embodiments, therefore, it may be desirable for the thermal partitions to be able to laterally or rotationally move so that one or more fans associated with a first cooling zone is able to cool both the first cooling zone and a second adjacent cooling zone. As shown in FIG. 5, fan 510*i* may be associated with a cooling zone defined by partitions 525*b* and 525*c*. Fan 510*l* may be associated with a cooling zone defined by partitions 525*c* and 525*d* when partitions 525*c* and 525*d* are closed (not shown in FIG. 5). Fan 510*o* may be associated with a cooling zone defined by partition 525*d* and power zone 515.

In some embodiments, a heat condition may be detected in the cooling zone associated with fan 510*l*. For example, one of nodes 520*j*, 520*k*, or 520*l* may be producing an increased amount of heat. Alternatively, fan 510*l* or one of the other fans associated with the cooling zone associated with fan 510*l* may not be operating at peak efficiency. Therefore, additional cooling may be desired in the cooling zone associated with fan 510*l*.

In some embodiments, one or both of partitions 525*c* and 525*d* may be opened such that fans 510*i* and/or fans 510*o* (or other fans in their rows) may be able to assist with cooling nodes in the cooling zone associated with fan 510*l*. For example, in FIG. 5, partitions 525*c* and 525*d* are open and fans 510*i* and 510*o* are able to assist with the cooling nodes 520*j*, 520*k*, and 520*l*.

In some embodiments, one of the partitions 525*c* or 525*d* may be opened based on the generation of a pressure differential. Specifically, fan 510*l* or other fans in its row may be operating at a reduced speed, and therefore generate less airflow (and less pressure) in its associated cooling zone. Fans 510*i* or 510*o*, or one or more of the other fans in their row, may operate at an increased speed to generate a higher pressure based on the increased airflow. The pressure difference on opposite sides of partitions 525*c* or 525*d* may be detected, for example by a pressure sensor, and one or both of partitions 525*c* or 525*d* may be laterally moved or rotated to allow fans 510*i* or 510*o* to assist with the cooling zone associated with fan 510*l*, for example by a motor either directly coupled with the partition or coupled with the partition via a belt. In some embodiments, the generated pressure difference may be enough to open the partitions automatically, for example through the use of a valve or some other passive mechanical opening.

In some embodiments, one or more of the thermal partitions may be coupled with a motor in a rack and pinion configuration such that when the motor rotates, a gear physically rotates and moves the partition laterally to open the partition. In some embodiments, one or more of the partitions may be coupled with a motor either via a belt or directly such that the motor is configured to rotate and, based on the coupling to the rotating motor, the partition rotates to open the partition. In some embodiments, one or more of the partitions may be arranged in a slatted or louver type arrangement and coupled with a motor either directly or via a belt. When the motor rotates, the slats may individually rotate to open the partition.

Figure 5A:
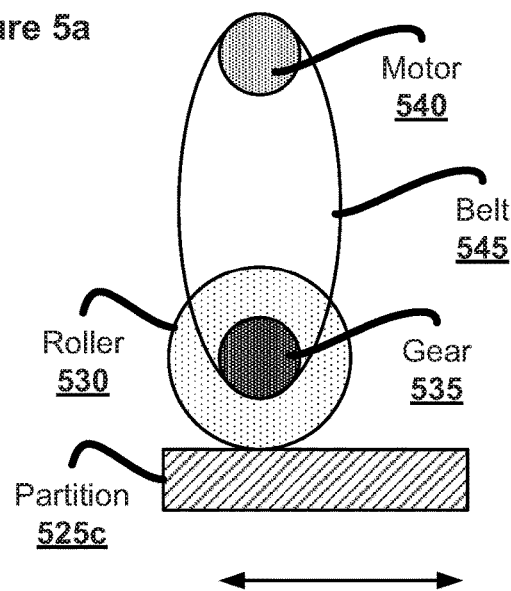
FIG. 5a illustrates a example of how an adjustable thermal partition may be adjusted, in accordance with various embodiments.

FIG. 5a illustrates an example of how an adjustable partition may be adjusted, in accordance with various embodiments. Specifically, FIG. 5a depicts one embodiment where partition 525c is coupled with a roller 530. The roller 530 may include a gear 535 that is coupled with a motor 540 via belt 545. The motor may be coupled with logic as described above with respect to FIG. 3. In some embodiments, the roller 530 and partition 525c may be notched and arranged in a rack and pinion configuration. In other embodiments, the roller 530 may not be notched but may be made of a material with a relatively high coefficient of static friction such as rubber or some other material. When motor 540 rotates (for example based on one or more signals from the logic), the belt 545 may cause the gear 535 to turn, which may in turn rotate roller 530. The rotation of roller 530 may cause partition 525c to move laterally as indicated by the arrow.

Figure 5B:
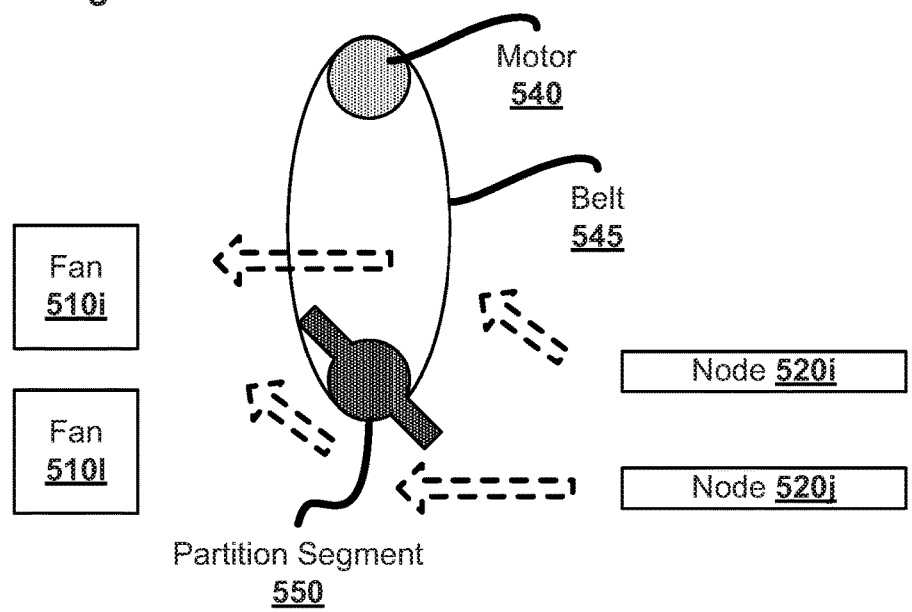
FIG. 5b illustrates another example of how an adjustable thermal partition may be adjusted, in accordance with various embodiments.

FIG. 5b illustrates another example of how an adjustable partition may be adjusted, in accordance with various embodiments. Specifically, FIG. 5b depicts a partition segment 550 which may be, for example, at least a portion of partition 525c. The partition segment 550 may be coupled with motor 540 via belt 545. When motor 540 rotates (for example based on one or more signals from the logic), the belt 545 may cause the partition segment 550 to also rotate, opening partition 525c. Thus, fan 510i may assist with cooling both node 520i and node 520j, as illustrated by the dashed arrows and described elsewhere in this specification.

Returning to FIG. 5, the dashed arrows show one indication of how air may flow in different cooling zones with partitions 525c and 525d open. For example, fan 510l (or another fan in its row) may be malfunctioning, and drawing a lesser amount of air. In response, fans 510i or 510o (or other fans in their rows) may speed up to draw a larger amount of air. This increased airflow may help to cool not only the nodes in the cooling zones of fans 510i or 510o, but also the nodes in the cooling zone of fan 510l. In embodiments where a partition such as partition 525c is open, the cooling zone associated with fan 510i may be considered to overlap the cooling zone associated with fan 510l.

Figure 6:
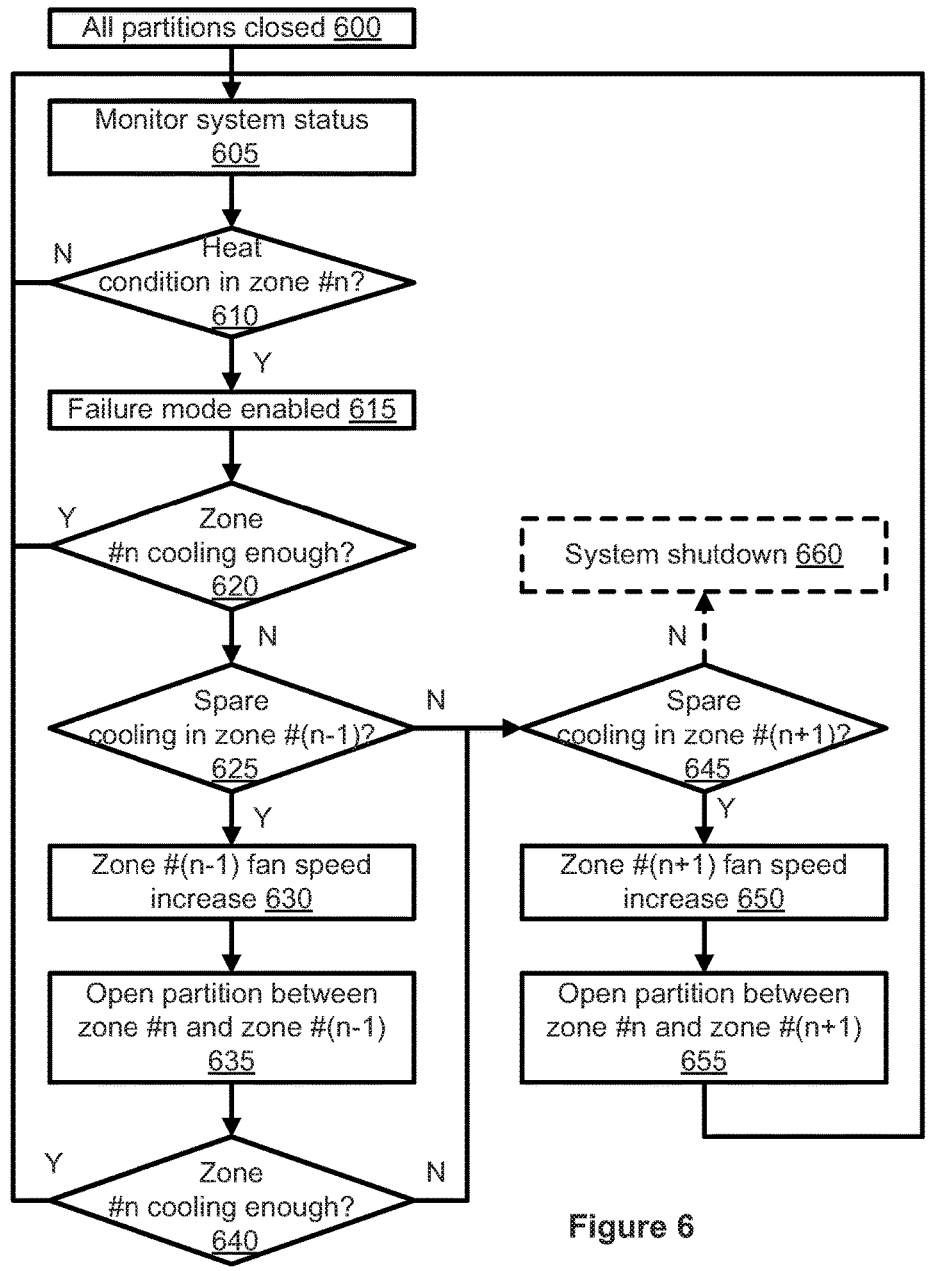
FIG. 6 illustrates an example method of cooling an electronic system with adjustable thermal partitions, in accordance with various embodiments.

FIG. 6 depicts an example process for allowing two cooling zones to overlap. For the sake of this discussion, adjacent cooling zones may be numbered sequentially. Therefore, cooling zone #n may be considered to be between, and directly adjacent to, cooling zones #(n−1) and #(n+1). With reference to FIG. 5, the cooling zone #n may be considered to be the cooling zone associated with fan 510l, while the cooling zone #(n−1) may be considered to be the cooling zone associated with fan 510i and the cooling zone #(n+1) may be considered to be the cooling zone associated with fan 510o.

In embodiments, the process of FIG. 6 may be performed by a logic which may be a process, module, circuitry, chipset, or other component of the electronic device 400 or 500. In embodiments, the logic may be implemented as software, hardware, firmware, or a combination thereof. For example, in some embodiments the logic may be implemented as firmware on a CPU, and/or the logic may be implemented as non-transitory computer-executable instructions stored in a DIMM. In other embodiments, the process may be performed by a separate logic process, module, circuitry, chipset, or component of the electronic device 400 or 500 such as a ROM. In some embodiments, the process may be performed by a logic process, module, circuitry, chipset, or component that is separate from, but communicatively coupled with, the electronic device 400 or 500. Although the electronic device and/or logic is described as a single entity performing certain monitoring or alteration steps, in some embodiments the monitoring and alteration may be performed by logic associated with different processors or logical modules. For example, there may exist separate monitoring logic and alteration logic.

Initially, all of the thermal partitions of an electronic device such as electronic device 500 may be closed at block 600. For example, cooling zone #n may be separated from cooling zone #(n−1) by partition 525c, and cooling zone #n may be separated from cooling zone #(n+1) by partition 525d.

System status, and particularly fan health status, may be monitored at 605. e.g., by logic such as the logic described above. At 610, the logic may make a determination on whether a heat condition in cooling zone #n is detected. If no heat condition is detected at 610, then the process may continue at 605 with the system status being monitored as earlier described. However, if a heat condition is detected in cooling zone #n, then a failure mode may be enabled by the logic at 615. Specifically, the process may enter a phase to attempt to remedy the heat condition. As discussed above, the heat condition may include a failure of a fan associated with cooling zone #n, a localized temperature increase of a node in cooling zone #n, an alteration in the configuration of the electronic device or some other heat condition.

Initially, the electronic device may attempt to identify whether the existing cooling capacity of the fans associated with zone #n is enough to cool zone #n at 620. For example, the process may enter a phase to attempt to identify whether the fans associated with zone #n may be operated at a different intensity and remedy the heat condition. If so, then the process may enter a phase such that the logic may attempt to remedy the heat condition and return to monitoring the system status at 605, as earlier described.

However, if the cooling capacity of zone #n is not enough to remedy the heat condition, then the process may enter a phase where the logic may attempt to identify whether spare cooling is available in zone #(n−1) at 625. Specifically, the process may enter a phase such that the logic may attempt to identify whether the fans of zone #(n−1) may be operated at a different intensity. If not, then the logic may identify whether spare cooling is available in zone #(n+1), as will be described below. However, if spare cooling is available in zone #(n−1), then the logic may facilitate an increase or otherwise alter the fan speed of fans associated with zone #(n−1) at 630 and open the partition between zone #n and zone #(n−1) at 635. For example, the logic may facilitate an increase the fan speed of fan 510*i* (and/or one or more other fans in its row) and open partition 525*c*.

The process, and specifically the logic, may then identify at 640 whether the additional cooling provided by the fans associated with zone #(n−1) is enough to cool zone #n at 640. If the additional cooling is enough, then the process may return to state 605 and monitor the system status, as earlier described. However, if the additional cooling provided by the fan(s) associated with zone #(n−1) is not enough, then the logic may identify whether spare cooling is available from fans associated with cooling zone #(n+1) at 645. If there is no additional cooling available from the fans associated with zone #(n+1), then the logic may optionally initiate system shutdown at 660, alert a user or administrator of the electronic device, or perform one or more other emergency or remedial measures.

However, if spare cooling is determined by the logic to be available from one or more fans associated with zone #(n+1), then the logic may facilitate an increase in the speed or intensity of one or more of the fans associated with zone #(n+1) at 650 and open the partition between zone #n and zone #(n+1) at 655. For example, the logic may facilitate an increase in the speed of fan 510*o* (or another fan in its row) and open partition 525*d*. The process may then return to state 605 where the system status is monitored, as earlier described.

The embodiment of the process of FIG. 6 described above is only one embodiment, and in other embodiments different operations may be performed in different order. For example, in some embodiments the order of operations at 630 and 635 or 650 and 655 may be switched.

In embodiments, a node such as nodes 520*a* through 520*r* may be referred to as a system, a system node, or a server node. For example, as noted above, in some embodiments a node such as nodes 520*a* through 520*r* may include an electronic device such as electronic devices 100 or 200. The nodes 520*a* through 520*r* may be referred to as "spread core" or "shadowed core" nodes and may include one or more elements, heat-generating components such as a HDD, cooling devices, CPUs, DIMMs, power supplies, PCIe Cards, or other elements. In other embodiments, a node such as nodes 520*a* through 520*r* may refer to a physically logical block of hardware dedicated to a single CPU socket (including DIMMs, storage, etc.). For example, an electronic device such as electronic device 100 or 200 may be considered to include one or more nodes.

As used herein for the discussion of FIGS. 5 and 6, above, the nodes 520*a*-520*r* are depicted as generally corresponding to electronic devices 100 or 200. However, in other embodiments, the thermal partitions 525*a*-525*e*, the cooling zones, and the process described with reference to FIG. 6 may be equally applicable to nodes in or on an electronic device 100 or 200 as described above. Additionally, even though the nodes are depicted in FIG. 5, in some embodiments the nodes of an electronic device 500 may additionally or alternatively be horizontally arranged to increase depth of page direction.

Figure 7:
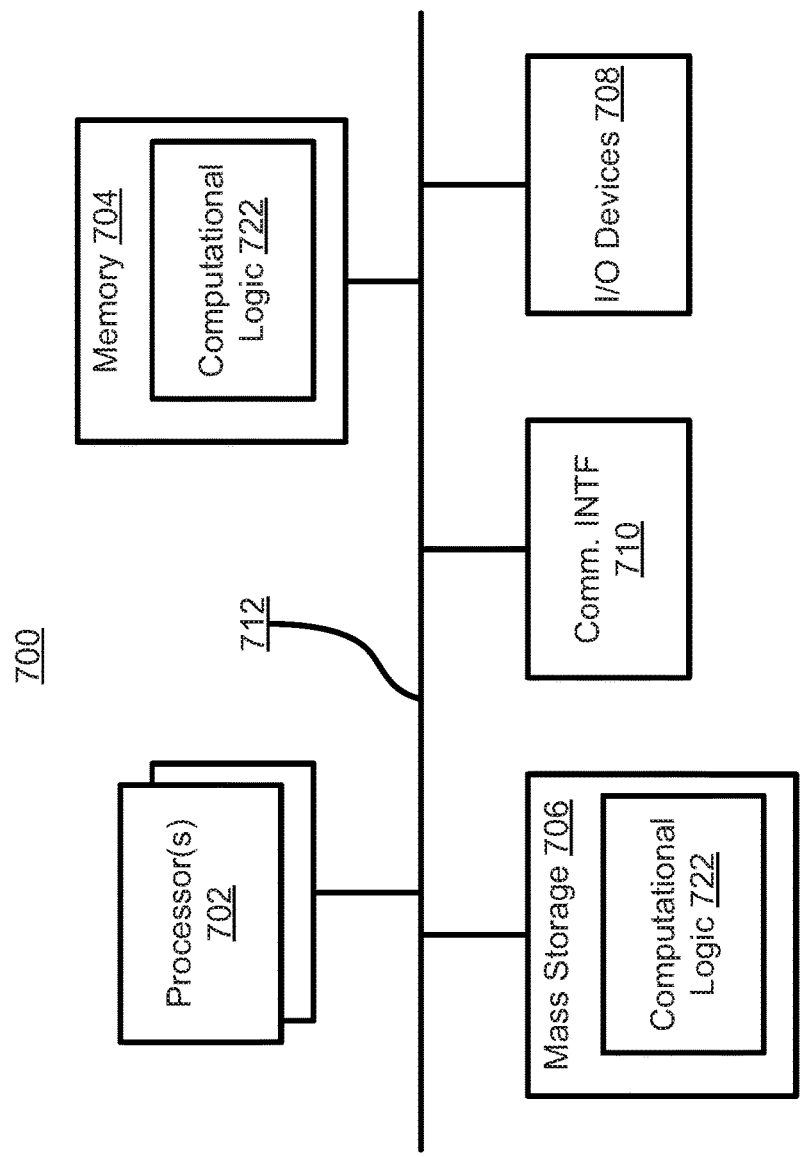
FIG. 7 illustrates an example computer system suitable for use to practice various aspects of the present disclosure, according to the disclosed embodiments.

FIG. 7 illustrates an example electronic device (e.g., computer 700) that may be suitable for use as a client device or a server to practice selected aspects of the present disclosure. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read-only memory (CD-ROM) and so forth), input/output (I/O) devices 708 (such as display, keyboard, cursor control and so forth) and communication interfaces 710 (such as network interface cards, modems and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with the adjustable cooling processes of FIG. 3 or 6, earlier described, collectively referred to as computational logic 722. The various elements may be implemented by assembler instructions supported by processor(s) 702 or high-level languages, such as, for example, C, that can be compiled into such instructions.

The number, capability and/or capacity of these elements 710-712 may vary, depending on whether computer 700 is used as a client device or a server. When used as a client device, the capability and/or capacity of these elements 710-712 may vary, depending on whether the client device is a stationary or mobile device, like a smartphone, computing tablet, Ultrabook™ or laptop. Otherwise, the constitutions of elements 710-712 may be known, and accordingly will not be further described. When used as a server device, the capability and/or capacity of these elements 710-712 may also vary, depending on whether the server is a single standalone server or a configured rack of servers or a configured rack of server elements.

Figure 8:
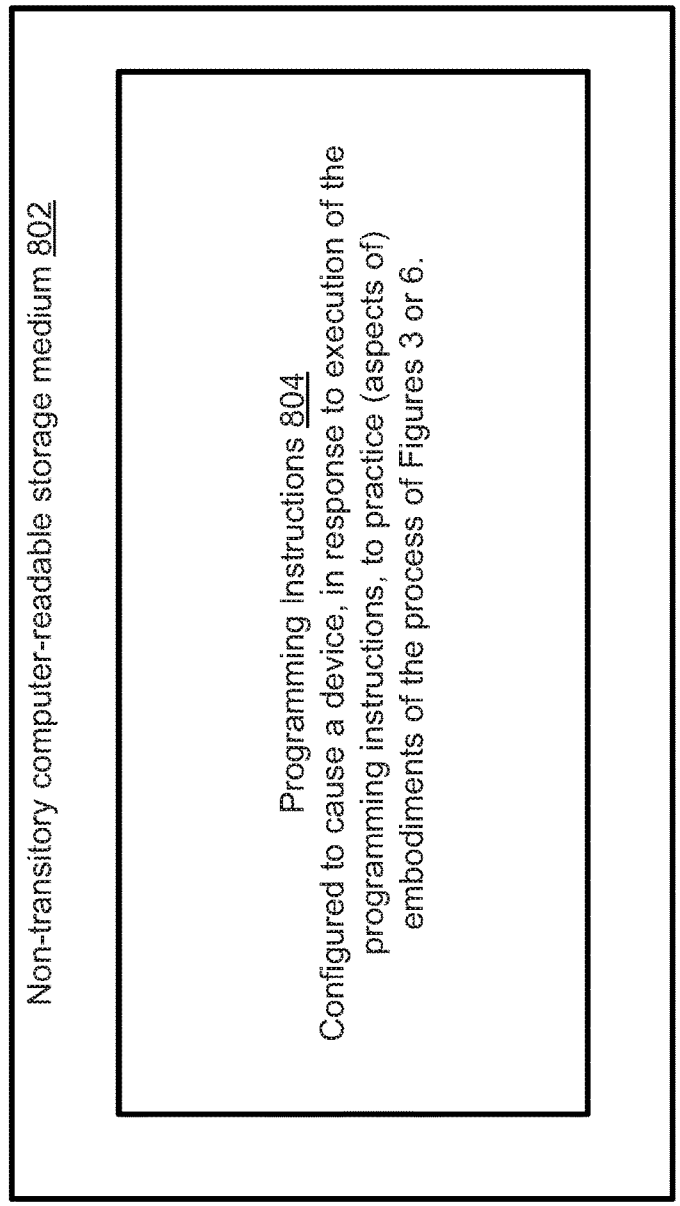
FIG. 8 illustrates a storage medium having instructions for practicing processes described with references to FIG. 3 or 6, according to disclosed embodiments.

As will be appreciated by one skilled in the art, the present disclosure may be embodied as methods or computer program products. Accordingly, the present disclosure, in addition to being embodied in hardware as earlier described, may take the form of an entire software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a device, e.g., computer 700, in response to execution of the programming instructions, to perform, e.g., various operations associated with the adjustable cooling processes of FIG. 3 or 6. In alternate embodiments, programming instructions 804 may be disposed on multiple computer-readable non-transitory storage media 802 instead. In alternate embodiments, programming instructions 804 may be disposed on computer-readable transitory storage media 802, such as signals.

Any combination of one or more computer-usable or computer-readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency (RF), etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer-readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements that are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 7, for one embodiment, at least one of processors 702 may be packaged together with memory having computational logic 722 (in lieu of storing on memory 704 and storage 706). For one embodiment, at least one of processors 702 may be packaged together with memory having computational logic 722 to form a System in Package (SiP). For one embodiment, at least one of processors 702 may be integrated on the same die with a memory having computational logic 722. For one embodiment, at least one of processors 702 may be packaged together with memory having computational logic 722 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may include an electronic device comprising: a plurality of heat-generating components; a plurality of cooling devices thermally coupled to the components to provide a plurality of cooling zones for the components, with each cooling device associated with a unique one of the cooling zones; and logic coupled with the plurality of cooling devices, the logic to cause a first cooling zone of a first cooling device to overlap a second cooling zone of a second cooling device.

Example 2 may include the electronic device of example 1, wherein the logic is to cause the first cooling zone of the first cooling device to overlap the second cooling zone of the second cooling device by facilitation of a physical rotation of an air duct generally disposed between the first cooling device and the first cooling zone of the first cooling device.

Example 3 may include the electronic device of example 1, further comprising a physical partition between the first cooling zone of the first cooling device and the second cooling zone of the second device, wherein the logic is to cause the first cooling zone of the first cooling device to overlap the second cooling zone of the second cooling device by facilitation of movement of the physical partition.

Example 4 may include the electronic device of example 3, wherein the physical partition is coupled with a motor to cause the physical partition to rotate or laterally move such that the first cooling zone of the first cooling device and the second cooling zone of the second cooling device overlap.

Example 5 may include the electronic device of any of examples 1-4, wherein a cooling device in the plurality of cooling devices is a fan.

Example 6 may include the electronic device of any of examples 1-4, wherein the logic is to cause the first cooling zone of the first cooling device to overlap the second cooling zone of the second cooling device upon detection of a heat condition associated with the second cooling device.

Example 7 may include the electronic device of any of examples 1-4, wherein the logic is to cause the first cooling zone of the first cooling device to overlap the second cooling zone of the second cooling device upon detection of an increased temperature in the second cooling zone of the second cooling device.

Example 8 may include the electronic device of any of examples 1-4, wherein the plurality of heat-generating components are disposed on a circuit board.

Example 9 may include the electronic device of any of examples 1-4, wherein the electronic device is a selected one of a smart phone, a tablet computer, an Ultrabook™, a e-reader, a laptop computer, a desktop computer, a set-top box, a server, a rack-scale server, or a game console.

Example 10 may include an apparatus comprising: a plurality of heat-generating components; a plurality of cooling devices thermally coupled to the components to provide a plurality of cooling zones for the components, wherein a plurality of air ducts are located between the plurality of cooling devices and the plurality of cooling zones; and logic coupled to the plurality of air ducts, the logic to facilitate rotation of an air duct in the plurality of air ducts such that a first cooling device that is associated with a first cooling zone prior to rotation of the air duct is associated with a second cooling zone subsequent to rotation of the air duct.

Example 11 may include the apparatus of example 10, wherein the first cooling device is a fan.

Example 12 may include the apparatus of example 10, wherein the logic is to facilitate rotation of the air duct upon detection of a heat condition of a second cooling device associated with the second cooling zone.

Example 13 may include the apparatus of example 12, wherein the heat condition is associated with an increased temperature of heat-generating component in the second cooling zone.

Example 14 may include the apparatus of example 13, wherein the rotation is a first rotation, and the logic is further to facilitate a second rotation of the air duct such that the first cooling device is associated with the first cooling zone upon detection that the heat condition has been remedied.

Example 15 may include the apparatus of any of examples 10-14, wherein the apparatus is a server.

Example 16 may include an apparatus comprising: a plurality of heat-generating components; means for providing cooling to a plurality of cooling zones for the components, having thermal partitions located between adjacent cooling zones; and means for facilitating opening of a thermal partition such that means for nominally providing cooling to a first cooling zone is further providing cooling to a second cooling zone adjacent to the first cooling zone subsequent to opening of the thermal partition.

Example 17 may include the apparatus of example 16, wherein the means for providing a plurality of cooling zones includes a plurality of fans.

Example 18 may include the apparatus of example 16, wherein the means for facilitating opening includes means for facilitating opening the partition based on detection of a heat condition related to the means for providing cooling to the second cooling zone.

Example 19 may include the apparatus of any of examples 16-18, wherein the means for facilitating opening further includes means for activating a motor coupled with the partition.

Example 20 may include the apparatus of any of examples 16-18, wherein the means for facilitating opening further includes means for generating a pressure differential on opposite sides of the partition.

Example 21 may include a method comprising: identifying, by logic of an electronic device, occurrence of a heat condition associated with a first cooling device of a first cooling zone of the electronic device; identifying, by the logic, a second cooling device of a second cooling zone that does not overlap the first cooling zone in a first physical configuration of the electronic device; and facilitating, by the logic, alteration of the first physical configuration such that the second cooling zone overlaps the first cooling zone.

Example 22 may include the method of example 21, wherein the facilitating includes facilitating, by the logic, physical rotation of an air duct positioned between the second cooling device and the second cooling zone.

Example 23 may include the method of example 21, wherein the facilitating includes facilitating, by the logic, opening of a thermal partition disposed between the first cooling zone and the second cooling zone when the electronic device is in the initial physical configuration.

Example 24 may include the method of example 23, wherein the facilitating includes activating, by the logic, a motor coupled with the partition, or generating, by the logic, a pressure differential on opposite sides of the partition.

Example 25 may include the method of any of examples 21-24, wherein the first cooling device or the second cooling device is a fan.

Example 26 may include one or more non-transitory computer-readable media comprising instructions to cause an electronic device, upon execution of the instructions by one or more processors of the electronic device, to: identify occurrence of a heat condition associated with a first cooling device of a first cooling zone of the electronic device; identify a second cooling device of a second cooling zone that does not overlap the first cooling zone in a first physical configuration of the electronic device; and facilitate alteration of the first physical configuration such that the second cooling zone overlaps the first cooling zone.

Example 27 may include the one or more non-transitory computer-readable media of example 26, wherein the instructions to facilitate include instructions to facilitate physical rotation of an air duct positioned between the second cooling device and the second cooling zone.

Example 28 may include the one or more non-transitory computer-readable media of example 26, wherein the instructions to facilitate include instructions to facilitate opening of a thermal partition disposed between the first cooling zone and the second cooling zone when the electronic device is in the initial physical configuration.

Example 29 may include the one or more non-transitory computer-readable media of example 26, wherein the instructions to facilitate include instructions to activate a motor coupled with the partition or generate a pressure differential on opposite sides of the partition.

Example 30 may include the one or more non-transitory computer-readable media of any of examples 26-29, wherein the first cooling device or the second cooling device is a fan.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An electronic device comprising:
   a plurality of heat-generating components;
   a plurality of cooling devices thermally coupled to the components to provide a plurality of cooling zones for the components, with each cooling device associated with a unique one of the cooling zones;
   a motor;
   a physical partition coupled with the motor, wherein the physical partition is between a first cooling zone of a first cooling device and a second cooling zone of a second cooling device; and
   logic coupled with the plurality of cooling devices, the logic to cause the first cooling zone of the first cooling device to overlap the second cooling zone of the second cooling device by directing the motor to laterally move the physical partition within a single plane.

2. The electronic device of claim 1, wherein a cooling device in the plurality of cooling devices is a fan.

3. The electronic device of claim 1, wherein the logic is to cause the first cooling zone of the first cooling device to overlap the second cooling zone of the second cooling device upon detection of a heat condition associated with the second cooling device.

4. The electronic device of claim 1, wherein the logic is to cause the first cooling zone of the first cooling device to overlap the second cooling zone of the second cooling device upon detection of an increased temperature in the second cooling zone of the second cooling device.

5. The electronic device of claim 1, wherein the plurality of heat-generating components are disposed on a circuit board.

6. The electronic device of claim 1, wherein the electronic device is a selected one of a smart phone, a tablet computer, an Ultrabook™, a e-reader, a laptop computer, a desktop computer, a set-top box, a server, a rack-scale server, or a game console.

7. An apparatus comprising:
   a plurality of heat-generating components disposed on a circuit board;
   a plurality of cooling devices thermally coupled to the components on the circuit board, the plurality of cooling devices to provide a plurality of cooling zones for the components, wherein a plurality of air ducts are located between the plurality of cooling devices and the plurality of cooling zones; and
   logic coupled to the plurality of air ducts, the logic to facilitate lateral movement within a single plane of a thermal partition of an air duct in the plurality of air ducts such that a first cooling device that is associated with a first cooling zone prior to movement of the air duct is associated with a second cooling zone subsequent to movement of the thermal partition of the air duct.

8. The apparatus of claim 7, wherein the first cooling device is a fan.

9. The apparatus of claim 7, wherein the logic is to facilitate movement of the thermal partition of the air duct upon detection of a heat condition of a second cooling device associated with the second cooling zone.

10. The apparatus of claim 9, wherein the heat condition is associated with an increased temperature of heat-generating component in the second cooling zone.

11. The apparatus of claim 10, wherein the movement is a first movement, and the logic is further to facilitate a second movement of the thermal partition of the air duct such that the first cooling device is associated with the first cooling zone upon detection that the heat condition has been remedied.

12. The apparatus of claim 7, wherein the apparatus is a server.

13. A method comprising:
   identifying, by logic of an electronic device, occurrence of a heat condition associated with a first cooling device of a first cooling zone of the electronic device;
   identifying, by the logic, a second cooling device of a second cooling zone that does not overlap the first cooling zone in a first physical configuration of the electronic device; and
   facilitating, by the logic, lateral movement within a single plane of a thermal partition disposed between the first cooling zone and the second cooling zone when the electronic device is in an initial physical configuration such that the second cooling zone overlaps the first cooling zone.

14. The method of claim 13, wherein the facilitating includes activating, by the logic, a motor coupled with the partition, or generating, by the logic, a pressure differential on opposite sides of the partition.

15. The method of claim 13, wherein the first cooling device or the second cooling device is a fan.

16. One or more non-transitory computer-readable media comprising instructions to cause an electronic device, upon execution of the instructions by one or more processors of the electronic device, to:
- identify occurrence of a heat condition associated with a first cooling device of a first cooling zone of a circuit board of the electronic device;
- identify a second cooling device of a second cooling zone of the circuit board that does not overlap the first cooling zone in a first physical configuration of the electronic device; and
- facilitate alteration of the first physical configuration such that the second cooling zone overlaps the first cooling zone, wherein the alteration includes lateral movement within a single plane of a thermal partition disposed between the first cooling zone and the second cooling zone.

17. The one or more non-transitory computer-readable media of claim 16, wherein the instructions to facilitate include instructions to facilitate physical rotation of an air duct positioned between the second cooling device and the second cooling zone.

18. The one or more non-transitory computer-readable media of claim 16, wherein the first cooling device or the second cooling device is a fan.

* * * * *